(No Model.) 2 Sheets—Sheet 1.
F. B. GRISWOLD
PNEUMATIC TIRE FOR VEHICLES.
No. 596,701. Patented Jan. 4, 1898.
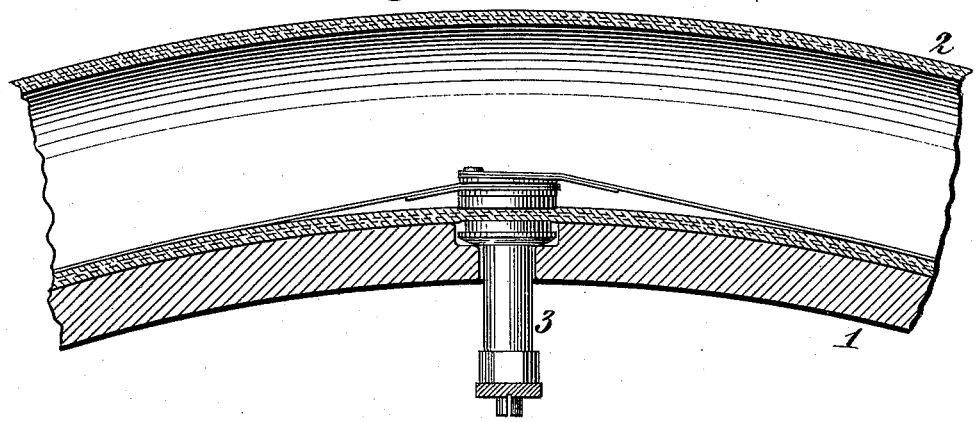
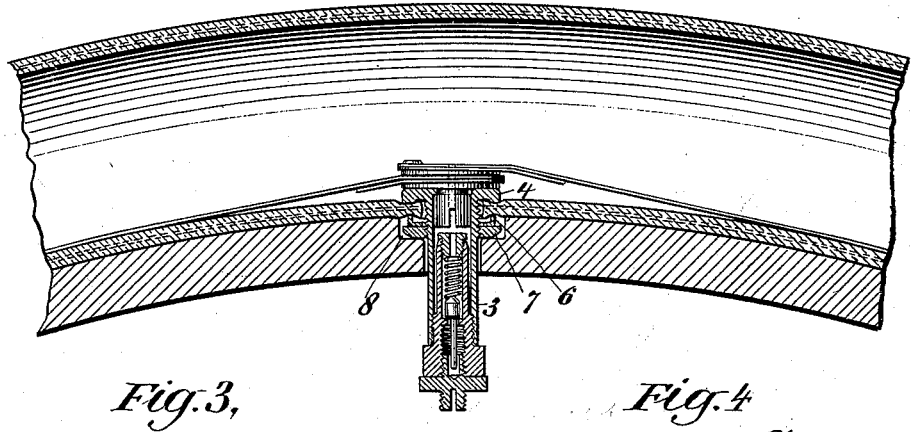
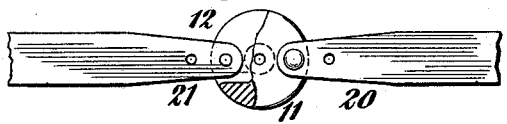
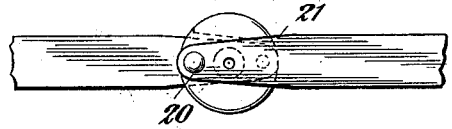
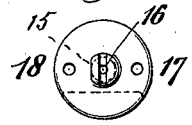
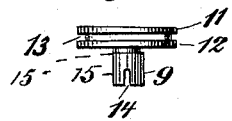
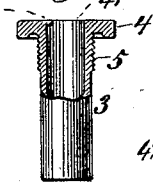
WITNESSES:
D. H. Hayward
H. R. Holler
INVENTOR
Frank B. Griswold
BY Park Benjamin
his ATTORNEY
THE NORRIS PETERS CO., PHOTO-LITHO., WASHINGTON, D. C.

(No Model.) 2 Sheets—Sheet 2.
F. B. GRISWOLD.
PNEUMATIC TIRE FOR VEHICLES.
No. 596,701. Patented Jan. 4, 1898.
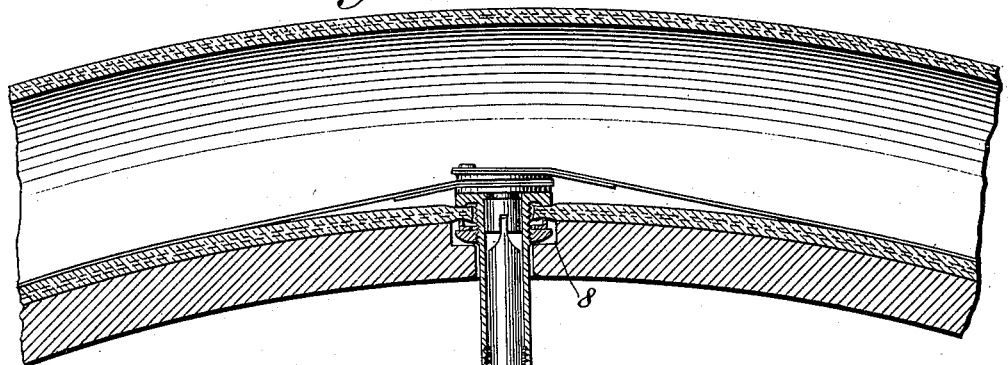
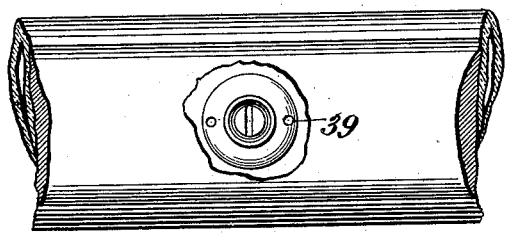
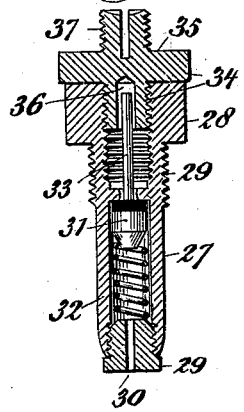
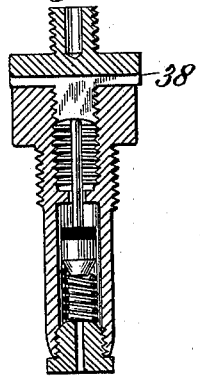
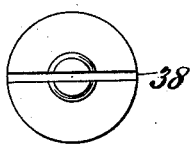
WITNESSES:
INVENTOR
Frank B. Griswold
BY Park Benjamin
his ATTORNEY
THE NORRIS PETERS CO., PHOTO-LITHO., WASHINGTON, D. C.

UNITED STATES PATENT OFFICE.

FRANK B. GRISWOLD, OF TROY, NEW YORK.

PNEUMATIC TIRE FOR VEHICLES.

SPECIFICATION forming part of Letters Patent No. 596,701, dated January 4, 1898.

Application filed March 10, 1897. Serial No. 626,724. (No model.)

*To all whom it may concern:*

Be it known that I, FRANK B. GRISWOLD, of Troy, Rensselaer county, New York, have invented a new and useful Improvement in Pneumatic Tires for Vehicles, of which the following is a specification.

My invention relates to means for mechanically and detachably connecting a pneumatic tire to the rim of a wheel.

While double tires, or, in other words, tires consisting, essentially, of an outer tire proper or sheath and an inner inflatable tube in which air for expanding the tire is confined, have been mechanically and detachably secured to wheel-rims, I know of no instance in the prior art where a single-tube or so-called "hose-pipe" tire which directly contains the air which inflates it has been secured by like means. The principal difficulty in doing this lies in the fact that the fastening device must be operated from the outside of the tire, and as a consequence it has hitherto been found impossible to effect this without making openings in the tire through which confined air would leak. My present device is the first in the art, so far as I know, wholly to overcome this difficulty, and therefore my invention consists, broadly, in a single-tube pneumatic tire which is mechanically and detachably secured to a wheel-rim. It is also a great desideratum that openings into such a tire should be reduced to a single one, and therefore to employ one necessary opening for the inflating-valve and another single opening for the tightening device is objectionable. I have overcome this difficulty by combining the valve and tightening device together, so that but one opening in the tire is necessary, and this also for the first time in the art; and therefore my invention consists, broadly, in a pneumatic tire in which the inflating-valve and the device for mechanically securing said tire to the wheel-rim are arranged in and require but one single opening in said tire.

My invention further consists in the combination of the tightening device and the valve in a single containing-case combined with the tire; also, in the combination of the tightening device and the case, the combination of the valve and the case, and the various other combinations and subcombinations of parts more particularly pointed out in the claims.

In the accompanying drawings, Figure 1 is a longitudinal section of the tire in place upon the rim, showing the combined tightener and valve in place and in side elevation, the tightener itself being suitably turned to produce a constriction of the band. Fig. 2 is a similar view showing the band-tightener and valve in the same position and in vertical section. Fig. 3 is a bottom view of the tightener with a portion of the lower plate broken away and exhibiting the position of the ends of the band before the tightener is turned to constrict the band. Fig. 4 is also a bottom view of the same, showing the position of the parts when the tightener is turned to produce a constriction of the band. Fig. 5 is a plan view of the tightener proper separate from other parts. Fig. 6 is a side elevation of the same. Fig. 7 represents the tubular case which receives the tightener-rod and the valve with a portion of the side broken away to show the interior. Fig. 8 is a longitudinal section of the tire in place and also of the tightener and valve-case with the valve removed and the key inserted for operating the tightener. Fig. 9 is a plan view looking from the under side of the rim with a portion of the rim broken away, showing the tightener-case with the valve removed, exhibiting in said case the outer end of the tightener-rod. Fig. 10 represents the key separately. Fig. 11 is a vertical section of the valve with the cap in place and exhibiting the valve on its seat, which is its ordinary condition when the tire is inflated. Fig. 12 is a similar section of the valve with the cap reversed and inserted in the end, so as to hold the valve away from its seat in order to permit escape of air, so as to deflate the tire. Fig. 13 is a plan view of the nicked or lower side of the valve-cap. Fig. 14 is a top view of the tubular case shown in Fig. 7.

Similar numbers of reference indicate like parts.

1 is a vehicle-rim. 2 is a continuous closed single-tube or hose-pipe tire containing no openings except the circular opening for the passage of the tubular case, which receives the tightener and the valve. This tubular case is shown separately at Fig. 7 and is represented at 3. It is provided with an integral flange 4, which rests when the case is in place upon the inner side of the tire, the body of the case then protruding through a hole in the tire and a hole in the rim. The body of the case is screw-threaded, as shown at 5, Fig. 7. After the case 3 is inserted through the hole in the tire, which through the elasticity of the tire expands sufficiently to permit the flange 4 to be introduced, a flanged washer 6 is placed upon said case outside of said tire. Outside of the washer is a nut 7. By screwing down this nut upon the case the tire is firmly clamped between the flanged edges of the washer 6 and the oppositely-turned edges of the flange 4. In this way the case 3 is tightly secured to the tire. When the tire is in place upon the rim, the nut 7 and washer 6 lie in a circular recess 8, made in the rim to receive them.

The case 3 receives two distinct devices, the first being the band-tightener and the second the valve. These parts I will describe separately. The band-tightener is shown in detail in Figs. 3, 4, 5, and 6, and, as best represented in Figs. 5 and 6, consists of a short cylindrical rod or stem 9, of metal, integrally formed, with which are two parallel plates 11 and 12, which are connected over a portion of their circumference, as shown at 13, so that there is a recess between them. The outer end of the rod 9 is nicked at 14 to receive a key, Fig. 10, like a screw-driver, by which it may be turned, and one side of the rod 9 is flat, as shown at 15. Around the body of the rod, adjacent to the plate 62, is a groove 15. There is also a small hole 16, which extends centrally through the plates 11 and 12 and the rod 9. In the plates 11 and 12 are holes 17 and 18, in which are pivoted the ends 20 and 21 of the band, which encircles the entire rim and which, as indicated in Figs. 1, 2, and 3, lies wholly within the tire. The end 20 is pivoted to the plate 11, and the end 21 is pivoted to the plate 12. The holes 17 and 18 lie diametrically opposite each other, so that the normal position of the ends 20 and 21 is as shown in Fig. 3. When, however, the rod 9 and hence the plates 11 and 12 are rotated on the axis of rod 9 over an arc of one hundred and eighty degrees, then the end 21 of the band is carried into the recess 13 between the plates 11 and 12, and the ends 20 and 21 are caused to overlap, as shown in Fig. 4, thus constricting the band and so binding the tire closely upon the rim.

The tire-tightener shown in Fig. 6 is inserted into the tube 3 in the following manner: Referring to Figs. 7 and 14, in the end of tube 3 is an opening 41 in the shape of a mutilated circle and adapted to receive the rod 9. The mutilation of the opening is caused by a thin plate 42. The rod 9 is easily inserted into the end of the tube 3 when its flat side 15 coincides with the straight edge of plate 42; but when the tightener is rotated in the case said plate 42 enters the groove 15 in rod 9, and in this way the tightener is detachably seated and held in the case 3. In order to rotate the tightener in order to produce a constriction of the band in the manner described or in reverse direction to loosen the band, the chisel end 24 of the key 25, Fig. 10, is inserted into the case 3, as shown in Fig. 8, so that said chisel end enters the nick 14 in the end of the rod 9. The enlargement 26 of the end of the key prevents the key from being inserted in the tube any more than is necessary to give it a proper connection with the rod 9; but the presence of this enlargement 26 is not essential, since any tendency which might be exerted by inward pressure on the key 25 to force the tightener inward and away from its seat is resisted by the bearing of the plate 42 in the groove 15.

I will now describe the tightener, its mode of operation, the case which receives the tightener, and the mode in which the case is secured to the tire; also, the manner in which the tightener itself is held and operated within the case.

I will now describe the construction and arrangement of the valve which occupies the outer portion of the case 3 beyond the end of the tightening-rod 9. This valve is best shown in Figs. 11 and 12. It consists of an outer casing 27, which is enlarged at 28 and is provided with a threaded portion 29, which enters a similarly-threaded portion within and at the outer end of the tube 3, as shown in Fig. 2. As the part 28 is polygonal, a wrench or other suitable tool may be applied thereto in order to screw the valve-body into its seat in the case 3 and to remove it therefrom at will. The lower end of the casing 27 is closed by a screw-plug 29, having an air-aperture 30.

31 is the valve proper, which rests against its seat within the casing 27 and is held to its seat by a spiral spring 32, interposed between said valve and the plug 29. The valve-stem 33 protrudes up through an opening in the seat. The threaded portion within the valve-casing 27, above the seat, as shown in Fig. 11, is to receive a screw-plug 34, which is formed integrally with the cap 35, and in the plug 34 is a chamber 36 to receive the end of the valve-stem 33. On the opposite side of the cap 35 is formed another screw-plug 37, adapted to enter the threaded chamber of the casing when the cap 35 is reversed, as shown in Fig. 12, and in the side of the cover 35 adjacent thereto is formed a slit or channel 38. In its normal condition this valve is arranged as shown in Fig. 7, the spring 32, as well as the pressure of the air, coming through the opening 30, operating to hold the valve proper to its seat. When, however, it is desired to deflate the tube and to make a clear opening for the air through the entire valve, the cover 35 is inverted and inserted in the casing, as shown in Fig. 12. Then the plug 37 bears upon the end of the valve-stem 33, pushing the valve downward against the action of the spring 32 and so permitting the air to pass through the opening 30, around the valve, through the clearance between the valve-stem and the seat, thence up through the channel 38 and the plug 37.

Having now described the details of the several parts, I will explain how they are assembled and how they are used in actual practice.

One end of the band is first inserted in the tire through the single aperture therein and pulled around the tire from the outside until it again appears at said aperture, when it is drawn through, both ends 20 and 21 of the band thus protruding. These ends are then pivoted, as already described and as shown in Figs. 3 and 4, in the holes 17 and 18 of the plates 11 and 12 of the fastener shown in Fig. 6. The fastener is then inserted in the case 3 and secured therein in the manner already described. The position of the two ends with respect to the fastener is then as shown in Fig. 3. The fastener-plates 11 and 12 and the flange 4 of the casing 3 are now pushed into the tire through the opening in said tire, which, as I have stated, is sufficiently elastic to permit it to expand enough to allow this to be done, the opening contracting again around the body of the casing after the insertion has been made. Then the flanged washer 6 is carried against the outside of the tire and the nut 7 screwed down, so that the casing and tightener are now properly secured in place. Then the key 25 is inserted in the casing 3 until it engages with the rod 9, and by this means the rod 9 is rotated, thus operating the fastener to bring the ends 20 and 21 of the band into the position shown in Fig. 4, thus constricting the band and so binding the tire tightly upon the rim. The valve-casing 27 is now inserted in the case 3 and screwed into place. The cap 35 being removed, a pump is applied to the end of the casing and air forced into the tire, this air moving the valve proper, 31, away from its seat, passing through the duct 30 and then through the hole 16, which extends centrally through the channel, and so entering the tire. In this way the tire is inflated. After the inflation is completed the cap 35 is applied, as shown in Fig. 11, and the tire is then ready for use.

In order to remove the tire, the valve-cap 35 is taken off, reversed, and placed in the position shown in Fig. 12. By this means, as already described, the valve proper, 31, is forced away from its seat and the air is allowed to escape. Then the valve-casing 27 is taken out of the casing 3, the key inserted in the nick 14 of the tightener-rod 9, and the tightener is rotated, so as to bring back the parts of the band into the position shown in Fig. 3, thus loosening said band. That done, both tire and band may be readily removed from the rim. If it is desired to take all the parts asunder, the nut 7 and washer 6 are loosened and taken off. The flange 4 and plates 11 and 12 are pulled through the hole in the tire again outward and one end 20 or 21 of the band released from the tightener, when the whole band can readily be drawn out through the tire-aperture.

For convenience in setting up the nut 7 I provide therein two openings 39, Fig. 9, adapted to receive pins 40 on the key-guard 26. The guard 26 has a circular aperture which fits over the case 3, so as to permit the pins 40 to enter the holes 39, the body portion of the key then serving as a lever for conveniently turning the nut.

The general construction of the tightener shown in Fig. 6 I have broadly claimed in another application for Letters Patent, Serial No. 617,758, filed by me January 2, 1897, and therefore such construction is not broadly claimed herein.

I claim—

1. The combination of a single-tube pneumatic tire and means of mechanically and detachably securing said tire to a wheel-rim, substantially as described.

2. The combination of a single-tube pneumatic tire, a band within said tire, a tightener for said band also within said tire, and means for actuating said tightener to shorten said band, substantially as described.

3. The combination of a single-tube pneumatic tire, a band within said tire, a tightener for said band also within said tire, and a rod for actuating said tightener extending externally to said tire, substantially as described.

4. The combination of a single-tube pneumatic tire, a band within said tire, a plate rotary in its own plane to which the ends of said band are connected and a rod secured to and projecting from said plate and extending through said tire, substantially as described.

5. The combination of a single-tube pneumatic tire, means of mechanically and detachably securing said tire to a wheel-rim, and an air-valve; both the said valve and the said securing device being disposed and operating in one tubular appendage hermetically joined to said tire, substantially as described.

6. The combination of a single-tube pneumatic tire, a tubular projection thereon, a band within said tire and a tightener for said band also within said tire and seated in said tubular projection, substantially as described.

7. The combination of a single-tube pneumatic tire, a tubular projection thereon, a band within said tire, a tightener for said band also within said tire and seated in, and operated to tighten said band through, said tubular projection, substantially as described.

8. The combination of a single-tube pneumatic tire, a tubular projection thereon, a band within said tire, a tightener for said band also within said tire and seated in said tubular projection, and a cylindrical casing containing an air-valve; the said casing being within and hermetically closing the open end of said tubular projection, substantially as described.

9. The combination of a single-tube pneumatic tire, a band within said tire, a tubular projection on said tire, a tightener for said band and an air-valve for said tire; said tightener and said valve being seated in said tubular projection, substantially as described.

10. The combination of a single-tube pneumatic tire, a band within said tire, a tubular projection on said tire, a tightener for said band seated in said projection and a casing containing an air-valve; the said valve-casing being located in said projection and capable of removal therefrom in order to allow access to said tightener, substantially as described.

11. The combination of a single-tube pneumatic tire, the tubular projection 3 secured thereto, the tightener consisting of the connected plates 11 and 12 and rod 9 secured in said projection 3 and rotary therein, and the band 21 having the ends attached to said tightener, substantially as described.

12. The combination of a single-tube pneumatic tire, the tubular projection 3 secured thereto, the tightener consisting of the connected plates 11 and 12 and rod 9 secured in said projection 3 and rotary therein, the band 20, 21, having its ends attached to said tightener and the casing 27 containing an air-valve detachably secured in said projection, substantially as described.

13. In combination with the internally-threaded valve-casing 27 containing an air-valve having a stem 33, the cap 35 provided with the externally-threaded projection 36 on one side, and the channel 38 and externally-threaded projection 37 on the opposite side, substantially as described.

FRANK B. GRISWOLD.

Witnesses:
H. R. MOLLER,
I. A. VAN WART.